INVENTOR
RICHARD E. NORWOOD
BY Henry E Otto Jr
ATTORNEY

Jan. 28, 1969 R. E. NORWOOD 3,424,063

APPARATUS USING DIAPHRAGM-TYPE FLUID-CONTROLLED LOGIC DEVICES AND METHOD OF MAKING SAME

Filed Nov. 19, 1964

United States Patent Office
3,424,063
Patented Jan. 28, 1969

3,424,063
APPARATUS USING DIAPHRAGM-TYPE FLUID-CONTROLLED LOGIC DEVICES AND METHOD OF MAKING SAME

Richard E. Norwood, Endicott, N.Y., assignor to International Business Machines Corporation, New York, N.Y., a corporation of New York Filed Nov. 19, 1964, Ser. No. 412,405
U.S. Cl. 92—98 2 Claims
Int. Cl. F01b *19/02;* F16j *3/00;* F16k *7/12*

ABSTRACT OF THE DISCLOSURE

High density, miniature fluid-controlled logic apparatus with abutting double-thickness diaphragms each adhered to a respective flat surface of one of two assembled housing members in surrounding relation to a plurality of closely spaced chamber-defining recesses and pressure-sealing ridges, to prevent leakage of pressure fluid between the closely spaced recesses, and provide a plurality of separate independently flexible diaphragms for each chamber, and enable disassembly of the apparatus without rupture of the diaphragms.

This invention relates to apparatus embodying fluid-controlled logic devices employing flexible diaphragms, and relates more particularly to an improved apparatus of such type and improved methods of making same.

There has been considerable interest in recent years in fluid-operated logic devices of the jet fluid amplifier type. In these devices, a low energy control signal can switch a higher energy fluid power stream to provide an amplified output signal that can be used as the input control signal to other similar logic devices. These fluid amplifier devices are capable of operating with control signal fluid pressures of about one-half lb. per square inch (p.s.i.) and power stream fluid pressures of about one p.s.i. They desirably embody no moving parts. However, they undesirably provide a continuous substantially unrestricted bleed of power stream fluid to atmosphere or some other low pressure outlet; and this results in consumption of considerable fluid power or energy when a number of these amplifier-type devices are combined into a fluid-operated control apparatus.

To overcome these disadvantages of jet fluid amplifiers, flexible diaphragm-type fluid-operated logic devices have more recently been proposed. These diaphragm-type devices are capable of operating at the same low control and power source pressures as the fluid amplifier-type devices; but with the diaphragm-type devices, power consumption is substantially reduced and the control pressure fluids are desirably isolated from the pressure fluid supplied from the power source.

Such flexible diaphragm-type fluid-operated logic devices may be of the type disclosed in my co-pending application U.S. Ser. No. 384,921, filed July 24, 1964, assigned to the assignee of the present invention and/or of the type disclosed in the Technical Disclosure Bulletin of International Business Machines Corporation at page 213 of the August 1964 issue; and at page 297 of the September 1964 issue. These devices generally comprise flexible diaphragms that respond to low control pressure signals to seal against a transverse or annular ridge and thereby cut off fluid flow through a communication leading from a high pressure inlet to a low pressure outlet, such as atmosphere. Although these devices may be employed as pneumatically controlled latch elements or interconnected to perform AND, OR and/or other logical functions, the particular logical function achieved is not important to the instant invention.

The principal object of this invention is to provide an improved, inexpensive and reliable apparatus comprising flexible diaphragm-type fluid-controlled logic devices and an improved simplified method of making same.

Another object is to provide a control apparatus on the above general type in which a positive seal is assured between members having complementary mating surfaces provided with preformed patterns of lands and grooves cooperating to define desired fluid chambers and ridges.

A further object is to provide an improved control apparatus of the above general type wherein complementary portions or subassemblies of such apparatus may be readily disassembled for inspection or servicing without destroying the bonding of the diaphragms with such members.

An additional object of the invention is to provide an apparatus using flexible diaphragm-type fluid-controlled logic devices wherein a plurality of diaphragms lying in the same plane are provided by single diaphragm-defining flexible sheets, irrespective of the logical functions to be performed by the particular logic devices employed.

According to these objects, the control apparatus embodying the invention comprises two members having complementary mating surfaces provided with cooperating preformed patterns of lands and grooves to define desired fluid chambers. Adhesive is applied to each of these surfaces, such as by adhesive-impregnated prepunched thin tissue, silk-screening, or other means, so as to provide adhesive except where a flexible diaphragm is desired. A flat sheet of flexible diaphragm material is applied to the adhesive-coated prepunched tissue or to the silk-screened adhesive pattern applied directly to the surface of each complementary member. The two members, each having a sheet of diaphragm material covering their respective mating surfaces, are then mounted in intimate abutting relation to provide a double-thickness diaphragm separating the chamber portions provided in each of the respective members and causing the respective chamber portions in each such member to be sealingly isolated from each other.

The foregoing and other objects, features and advantages of the invention will be apparent from the following more particular description of preferred embodiments of the invention, as illustrated in the accompanying drawings, wherein.

Figure 2:
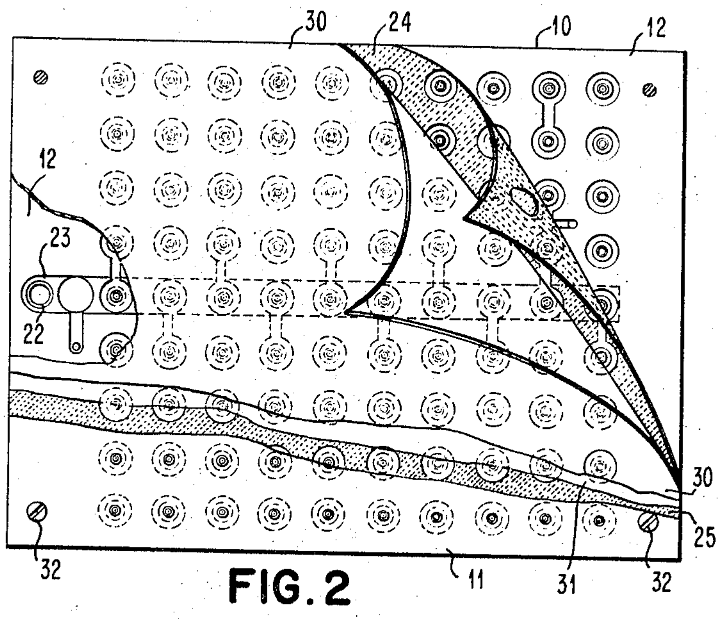
FIG. 2 is a plan view of the apparatus, partly broken away and with some layers peeled back to show the construction thereof.
Figure 1:
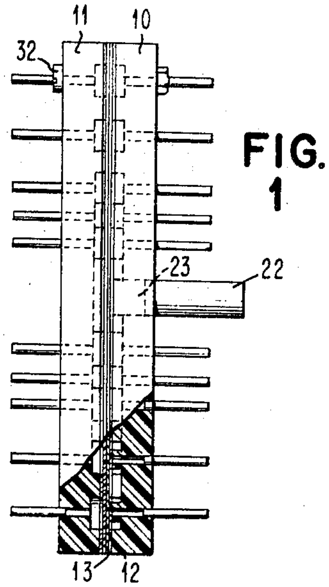
FIG. 1 is a side elevational view, partly in section, of a control apparatus constructed according to one embodiment of the invention and comprising two subassemblies, including members with substantially flat facing surfaces.
Figure 4:
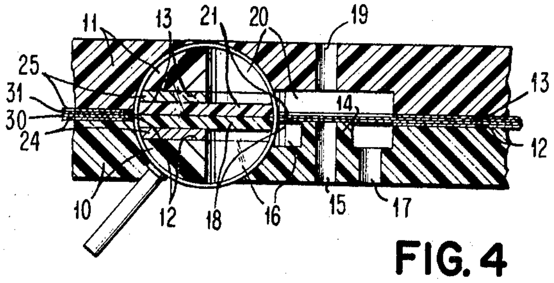
FIG. 4 is a fragmentary section view to enlarged scale and magnified in part showing the assembly formed of a fluid-logic device employing an annular ridge against which the double diaphragm seats and seals.
Figure 6:
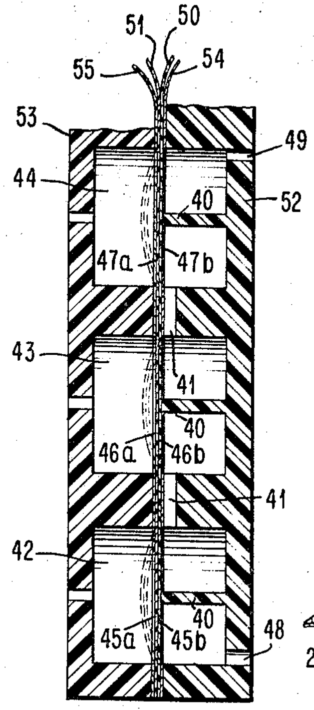
Figure 3:
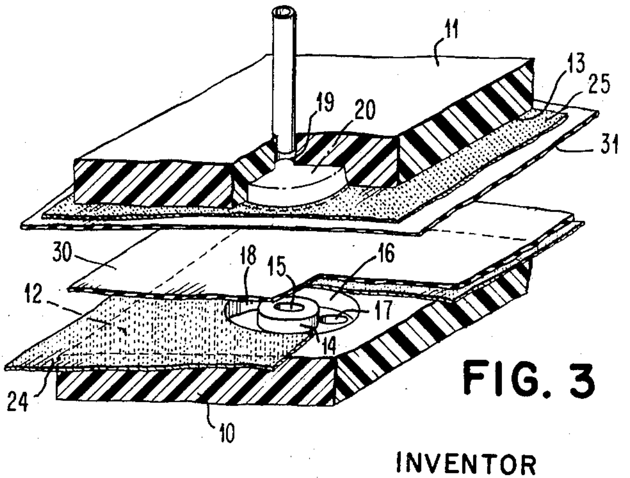
FIG. 3 is an exploded fragmentary view, to enlarged scale, of the control apparatus constructed according to said one embodiment of the invention.
Figure 7:
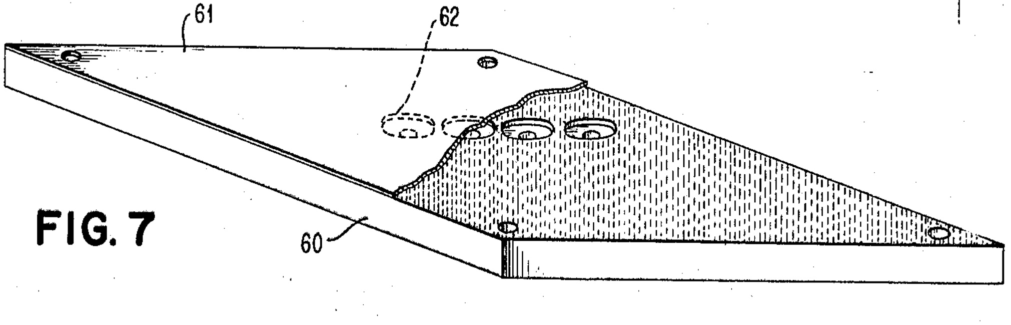

FIG. 6 is a fragmentary section view, to enlarged scale, of an assembly employing a transverse ridge against which the double diaphragm is seatable and sealable according to a variation of the invention; and, FIG. 7 is a perspective view, to enlarged scale, of the lower subassembly of a control apparatus constructed according to another embodiment of the invention involving use of a silk-screening process to apply adhesive to preselected areas.

*Description (FIGS. 1 to 5)*

The control apparatus constructed according to this embodiment of the invention comprises two members 10, 11 having complementary, such as flat, adjacent surfaces 12, 13, respectively. As illustrated, member 10 comprises a piece of plastic or other material in which has been preformed or otherwise provided a plurality of recesses defining a plurality of annular ridges 14 (FIG. 4) encircling inlet ports 15 and surrounded by annular chambers 16 that are connected to outlet ports 17 at one side of a flexible diaphragm 18. Member 11 has the control port 19 leading to a control chamber 20 at one side of a flexible diaphragm 21.

It is to be noted that diaphragms 18, 21 overlie and abut each other, but are not adhered to each other. Thus, pressure fluid supplied to inlet port 15 can displace the double-thickness flexible diaphragm 18, 21, toward port 19 and spill over annular ridge 14 and via chamber 16 into outlet port 17, provided control chamber 20 is not charged with pressure fluid. If control pressure fluid is supplied to chamber 20 via control port 19, it will be effective over substantially the full area of diaphragm 18, 21 and, hence, hold the diaphragm seated and sealed against ridge 14 to prevent flow from port 15 to port 17. Accordingly, since the inlet pressure fluid acts over a very small area and the control pressure fluid acts over a substantially larger area, the control pressure and inlet pressure may be of equal absolute values and supplied from a common source; e.g., via a supply conduit 22 that is connected to a common manifold 23 preformed in member 10.

To fabricate the control apparatus, a predetermined pattern of lands, grooves, channels and/or ports is preformed in the respective members 10, 11, corresponding to the particular configurations of chambers (like 16, 20), ridges (like 14), and ports (like 15, 17, 19) desired.

Figure 5:
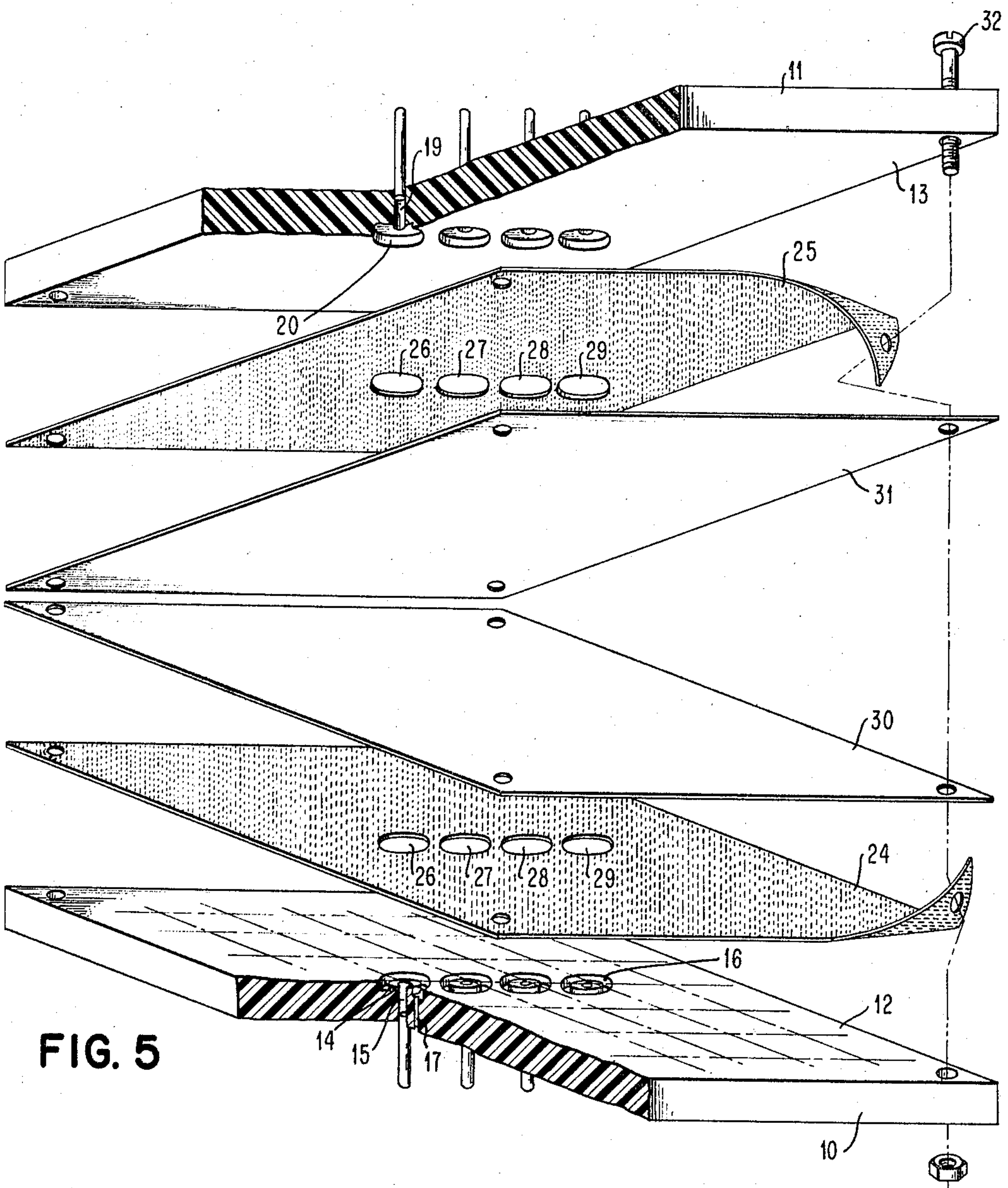
FIG. 5 is an exploded perspective view to enlarged scale of the control apparatus constructed according to said one embodiment of the invention.

Separate pieces 24, 25 of a suitable adhesive carrier, such as thin tissue paper, are then prepunched or otherwise perforated to provide openings, such as 26, 27, 28, 29 (FIG. 5). These openings are provided at those places where the pieces 24, 25 are intended to overlie chambers, ridges, or ports provided in the surfaces 12, 13 of members 10, 11. After perforating, both sides of the pieces are effectively impregnated or coated with a suitable adhesive. This may, for example, comprise a suitable resin adhesive such as Pliobond (Goodyear Tire & Rubber Co.'s trade name for their nitrile phenolic contact cement) or Adiprene L–100 (E. I. du Pont de Nemours & Co.'s trade name for their polyurethane rubber); however, the particular type of adhesive used forms no part of the present invention, and other suitable adhesives, thermosetting or thermoplastic, may be used. In any event, the resin is preferably associated with a solvent that will permit the resin to be applied by spraying. This coating may be actually applied to both sides of the carrier pieces 24, 25; or if the porosity of the carrier permits, both sides may be effectively coated by osmosis, upon applying adhesive to only one side.

The adhesive-impregnated pieces 24, 25 are then adhered to surfaces 12, 13, respectively, properly positioned so as to overlie the chambers, ridges and ports as above indicated. Separate sheets 30, 31 of thin flexible material are now laid flat over the then exposed adhesive-impregnated surfaces of carrier pieces 24, 25, respectively, so as to be co-extensive with the corresponding surfaces 12, 13. If a thermosetting resin is used, the resultant two subassemblies must be suitably cured. These subassemblies, with the respective sheets 30, 31 adhered thereto, are then suitably secured together, such as by screws 32, such that the uncoated sides of the sheets 30, 31 abut each other to provide a plurality of double-thickness flexible diaphragms (like 18, 21). Each such double-thickness diaphragm is sealingly isolated from the other double-thickness diaphragms and each overlies a respective chamber located at those places which are free of adhesive.

This method of fabrication thus desirably provides a control apparatus comprising at least one pair of diaphragms, with one such diaphragm being glued to each subassembly. When the subassemblies are mated and secured, the diaphragms constitute a double-thickness diaphragm that operates in a manner similar to that of a single diaphragm. This method of fabrication assures that a positive seal of the flexible diaphragm material can be achieved with both subassemblies. It also facilitates the positioning of the subassemblies with respect to each other during assembly into the final unit; and it enables the assembly to be readily disassembled for inspection or servicing without destroying the diaphragms, owing to the absence of the adhesive between the abutting surfaces of sheets 30, 31. Moreover, preperforating of the carrier pieces 24, 25 simplifies assembly of the subassemblies by enabling accurate application of the adhesive to the proper places.

*Description (FIG. 6)*

The apparatus constructed according to this variation of the invention differs from the apparatus from FIGS. 1 to 5 in that the former employs transverse ridges, like 40 (instead of annular ridges), and has channels, like 41. As illustrated, if control pressure fluid is supplied to any one of the control chambers 42, 43, or 44, the corresponding double-thickness diaphragms **45*a*, 45*b*; or 46*a*, 46*b*; or 47*a*, 47*b*, will seat and seal against the corresponding ridge 41. Thus, flow of pressure fluid from an inlet port 48 to outlet port 49 will be prevented if any one or more of the chambers 42, 43 or 44** is charged, for thereby performing a logical OR function.

As in the first-described embodiment, the double-thickness diaphragms are provided by use of separate sheets, 50, 51, of thin flexible material which are effectively bonded to the respective members 52, 53 by adhesive-impregnated carriers 54, 55.

*Description (FIG. 7)*

According to this embodiment of the invention, the adhesive is applied directly to the adjacent surfaces of each member (such as 60) forming one of the subassemblies of the apparatus, by means of conventional silk-screening techniques. As in the first embodiment, adhesive is applied only at those places where the diaphragm-defining sheet material 61 is to provide a seal between adjacent diaphragms, and is not applied to those areas which are to constitute one (such as 62) of the double-thickness diaphragms. By way of example, the silk-screening technique employed may be substantially as disclosed in U.S. Patent 2,641,675 or National Bureau of Standards Circular 468.

It is to be emphasized that the present invention is not concerned with the particular control functions to be performed by the control apparatus or the detailed configurations of the recesses, but rather with the general configuration and method of fabrication of a control apparatus embodying fluid-actuated flexible diaphragms. The various configurations of chambers, ridges, ports and/or channels shown in the accompanying drawings are for purposes of illustration only, and the invention is not to be deemed limited except by the appended claims.

While the invention has been particularly shown and described with reference to preferred embodiments thereof, it will be understood by those skilled in the art that various changes in form and details may be made therein without departing from the spirit and scope of the invention.

What is claimed is:

1. A high density fluid controlled apparatus comprising, in combination:

two members providing substantially flat surfaces of relatively large surface area with respective pluralities of distinct adjacent recesses provided therein to at least partially define a plurality of adjacent chambers in each of such surfaces;

two thin adhesive carriers, each perforated at those places overlying such chambers and having both sides coated with adhesive except at such places, one of such carriers having its one side adhered to one of said surfaces, and the other of said carriers having its said one side adhered to the other surface;

two sheets of flexible material, each applied to the respective opposite sides of a corresponding one of such adhesive-coated carriers to provide independently flexible diaphragms overlying each of said chambers and prevent leakage of pressure fluid between adjacent chambers; and means for maintaining in abutting relation the sheets pre-adhered to the respective carriers so as to provide double-thickness flexible diaphragms at those places free of adhesive to enable disassembly of the apparatus into separate parts without damage to said diaphragms, owing to the absence of adhesive between the abutting surfaces of said sheets.

2. A method of fabricating a high density fluid controlled apparatus for performing fluid logic functions, comprising the steps of:

providing two members with complementary flat surfaces of relatively large surface area;

preforming in said surfaces preselected patterns of pluralities of separate and distinct recesses cooperating to define a plurality of chambers;

providing thin carrier elements, each having an area substantially co-extensive with that of a corresponding one of said surfaces;

perforating each element at those areas where it will overlie a chamber;

coating each element on both sides with adhesive;

adhering each element to the appropriate one of such surfaces;

adhering to the then exposed side of each such element a separate sheet of thin flexible material; and securing the then exposed surfaces of said sheets in abutting relation to provide a control apparatus having a plurality of double-thickness flexible diaphragms sealingly isolated from each other and overlying such chambers and readily disassembleable without injury to the diaphragms, due to the lack of adhesive on the abutting surfaces of the diaphragm-defining sheets.

References Cited

UNITED STATES PATENTS

| | | | |
|---|---|---|---|
| 3,111,187 | 11/1963 | Barlow | 181—31.1 |
| 2,529,028 | 11/1950 | Landon | 137—102 |
| 2,667,184 | 1/1954 | Hailer | 92—98 |
| 2,722,962 | 11/1955 | Hampshire | 156—580 |
| 2,902,048 | 9/1959 | Ryan | 137—510 |
| 2,923,331 | 2/1960 | Jeffrey | 137—315 |
| 2,940,016 | 6/1960 | Flint | 317—101 |
| 2,980,032 | 4/1961 | Schneider | 103—150 |
| 3,044,479 | 7/1962 | Meyer | 137—68 |

FOREIGN PATENTS 111,405 7/1964 Czechoslovakia.

OTHER REFERENCES

"Exclusive or Logic Circuit Using Diaphragm Elements," IBM Technical Disclosure Bulletin, D. F. Jensen, vol. 7, No. 3, August 1964, p. 216 (copy in 235/201).

WILLIAM F. O'DEA, *Primary Examiner.*

HOWARD M. COHN, *Assistant Examiner.*

U.S. Cl. X.R.

92—103; 156—580; 251—331